United States Patent [19]

Flotow

[11] Patent Number: 5,007,517
[45] Date of Patent: Apr. 16, 1991

[54] ADJUSTABLE HYSTERESIS DAMPER

[75] Inventor: Richard A. Flotow, Butler, Ind.

[73] Assignee: Dana Corporation, Toledo, Ohio

[21] Appl. No.: 457,373

[22] Filed: Dec. 27, 1989

[51] Int. Cl.$^5$ ............................................. F16D 3/14
[52] U.S. Cl. .............................. 192/106.1; 192/70.17;
192/70.25; 192/110 R; 464/68
[58] Field of Search .............. 192/106.1, 70.17, 70.16,
192/70.25, 110 R; 464/68

[56]  References Cited
U.S. PATENT DOCUMENTS

| | | | |
|---|---|---|---|
| 1,896,914 | 2/1933 | Paton | 192/106.2 |
| 2,158,244 | 5/1939 | Mistretta et al. | 192/68 |
| 2,276,416 | 3/1942 | Nutt | 192/68 |
| 2,286,502 | 6/1942 | Newton | 192/68 |
| 3,863,747 | 2/1975 | Werner et al. | 192/70.17 |
| 3,931,876 | 1/1976 | Beeskow et al. | 192/106.1 |
| 4,101,015 | 7/1978 | Radke | 192/106.2 |
| 4,254,855 | 3/1981 | Hildebrand | 192/106.2 |
| 4,485,908 | 12/1984 | Gatewood | 192/106.2 |
| 4,537,295 | 8/1985 | Fadler et al. | 192/106.2 |
| 4,553,655 | 11/1985 | Lech, Jr. et al. | 192/106.2 |
| 4,601,377 | 7/1986 | Flotow et al. | 192/110 R |
| 4,615,426 | 10/1986 | Lech, Jr. | 192/106.2 |
| 4,651,857 | 3/1987 | Schraut et al. | 192/106.1 |
| 4,687,087 | 8/1987 | Tebbe | 192/70.17 |

Primary Examiner—Allan D. Herrmann
Assistant Examiner—Andrea Pitts
Attorney, Agent, or Firm—Marshall & Melhorn

[57]  ABSTRACT

A clutch driven disc assembly includes a hub, a support plate and at least one reinforcing plate mounted on and rotatable relative to the hub, a plurality of circumferentially spaced fasteners connecting together the support plate and the reinforcing plate, and a coaxial spring damper. In an alternate embodiment, the support plate is attached to one of a pair of outer covers positioned on opposite sides of a flange radially extending from the hub and rotatable relative to the hub. An apparatus for adjusting hysteresis in the damper includes a backing plate mounted on the hub with facing material abutting either the fasteners or the other cover for applying an axial load to the support plate. The load is selectively adjustable through a threaded locking nut and wave washer mounted on the hub.

14 Claims, 3 Drawing Sheets

ADJUSTABLE HYSTERESIS DAMPER

BACKGROUND OF THE INVENTION

The present invention relates generally to friction clutches for automotive vehicles and, in particular, to an apparatus for adjusting the hysteresis in a clutch damper.

In conventional passenger cars and trucks, objectional driveline vibrations may occur at certain speeds and road conditions. Some of these disturbances may be eliminated or reduced to an acceptable level with the incorporation of a torsional damper in the driven disc portion of the vehicle clutch. Damping is normally provided by a plurality of circumferentially spaced coil springs operatively connected between relatively rotatable elements of the clutch driven disc assembly.

Clutches with dampers are widely used in all types of power transmission systems. In recent years, particularly in the heavy duty field, conventional spring dampers have not performed satisfactorily when used with the newer higher torque engines. Due to fuel efficiency considerations, these engines operate at a lower speed range with fewer transmission speeds in a critical torsional range and, as a result, impose considerably higher torsional vibration loads on the spring damper than previous engines. This translates into greatly increased stresses on the damper spring which can increase damper spring failure. Additional clutch damage and rapid wear of the associated transmission input shaft and vehicle driveline components may follow.

One solution used to increase the torque capacity of heavy duty clutch driven disc assemblies has been to provide a two part cover designed to house a plurality of circumferentially spaced coaxial pairs of damper springs positioned in aligned openings formed in each cover part. The openings in one cover part engage the ends of both springs while the other cover part engages only the ends of one spring.

The above-described damper assemblies require a clutch assembly in which the outer covers and the hub rotate in unison and the disc and reinforcing plates with the springs rotate in unison relative thereto thus creating a load versus position curve. In some designs, certain additions between these two subassemblies will create hysteresis in the curve. For example, wave washers, Belleville springs or even disc facing material can cause an hysteresis effect.

SUMMARY OF THE INVENTION

The present invention concerns an apparatus for adjusting the hysteresis in a clutch damper. The adjusting apparatus permits adjustment of a clutch damper load at an initial assembly to maintain constant hysteresis throughout the damper travel and readjustment after wear has occurred and the load has been reduced. A clutch driven disc assembly includes a support plate to which facing material is attached, and reinforcing plates which are riveted to the support plate for rotation as a unit with respect to a hub. The rivet heads are enlarged and machined to a selected height.

An adjustment means including a backing plate is mounted on the hub. The backing plate with facing material is abutted against the rivet heads by a wave washer or the like which applies an axial load. The load applied to the backing plate is adjustable by threading a locking nut onto the hub. A locking washer positioned between the nut and the wave washer has one tang which engages a keyway formed in the hub. A second tang on the locking washer engages a slot in the backing plate to prevent relative rotation between the hub and the backing plate. The keyway in the hub can be formed wider than the associated tang on the locking washer to allow for a period of free travel before loading occurs.

In an alternate embodiment, a clutch driven disc assembly includes a support plate attached to one of two outer covers which are mounted on and rotatable relative to a central hub. The covers retain damper springs and are attached together by rivets extending through elongated slots formed in a flange on the hub. The above described adjustment means is mounted on the hub and the facing material on the backing plate is abutted against an outer surface of the other outer cover for applying an axial load to the damper.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
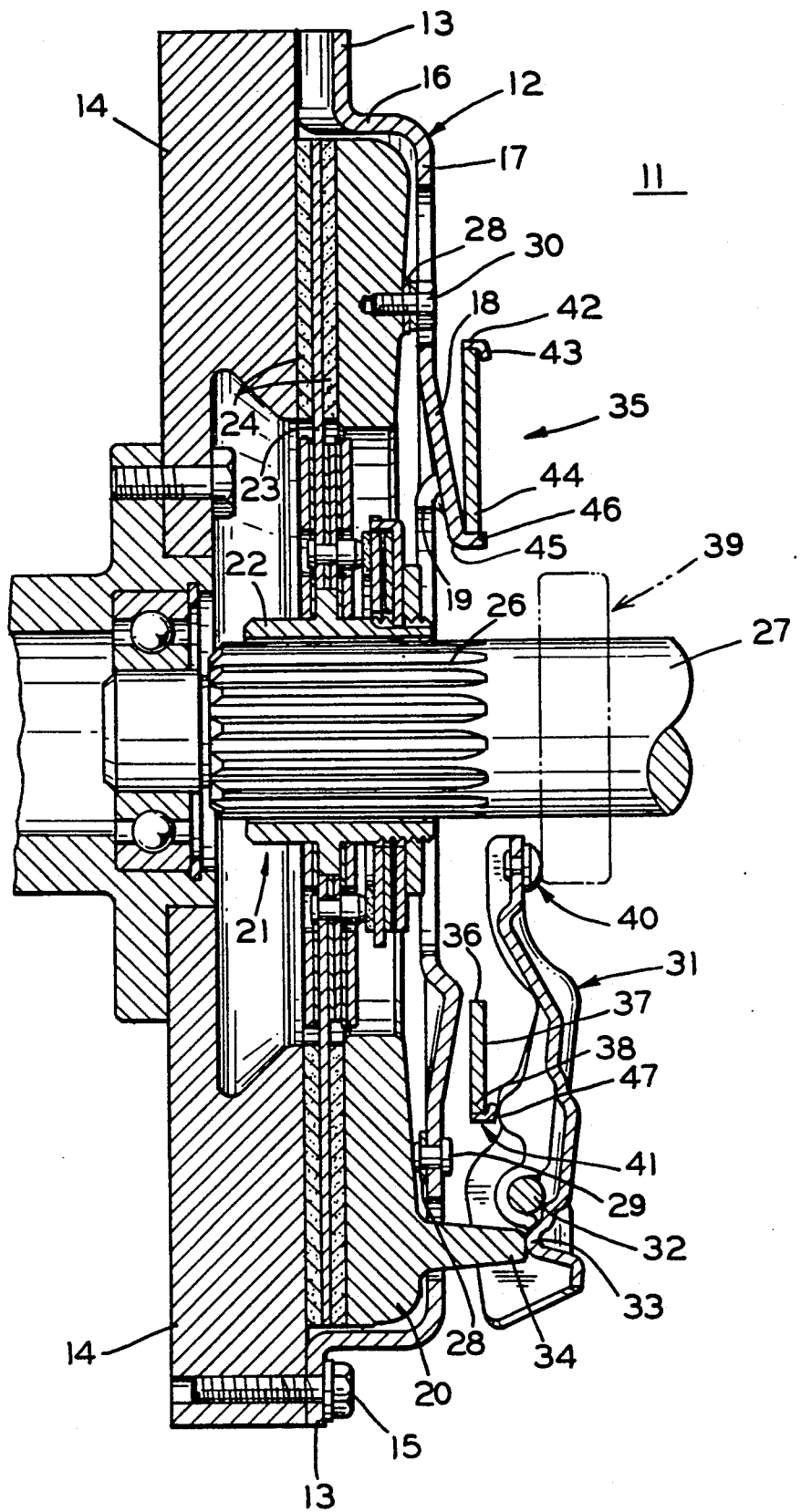
FIG. 1 is a cross-sectional view of a clutch incorporating an apparatus for adjusting hysteresis in accordance with the present invention.

There is shown in FIG. 1 a cross sectional view of a friction clutch 11 embodying an apparatus for adjusting damper hysteresis in accordance with the present invention. The clutch 11 includes an annular cover 12 which has a peripheral flange portion 13 extending in a generally radial direction. The flange portion 13 is attached to a rear face of a standard flywheel 14 by a plurality of circumferentially spaced bolts 15 such that the cover 12 rotates with the flywheel 14. The cover 12 also includes a rim portion 16 extending in a generally axial direction between the flange portion 13 and an end wall 17 extending radially inwardly from the rim portion 16 and terminating in an angularly disposed ramp 18. A radially inner portion of the ramp 18 defines a central opening 19 in the end wall 17. A pressure plate 20 is positioned between the flywheel 14 and an inner surface of the cover 12. A driven disc assembly 21 is adapted to be clamped between the flywheel 14 and the pressure plate 20.

Figure 2:
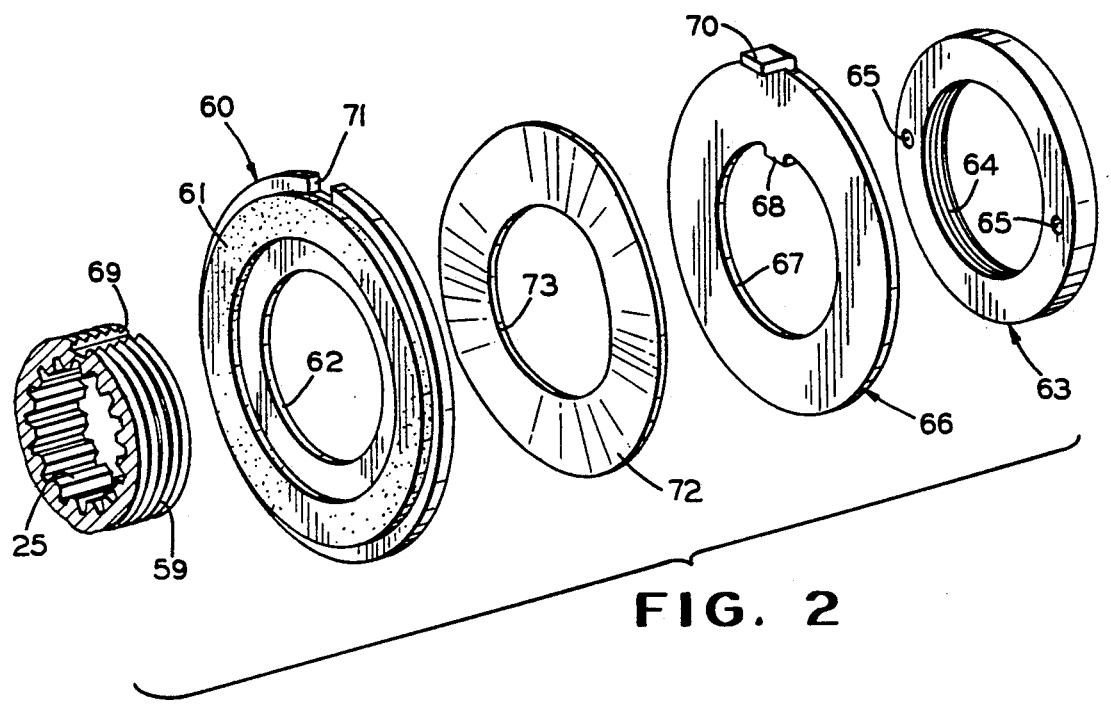
FIG. 2 is an exploded perspective view of a portion of the hub and adjusting apparatus shown in FIG. 1.
Figure 3:
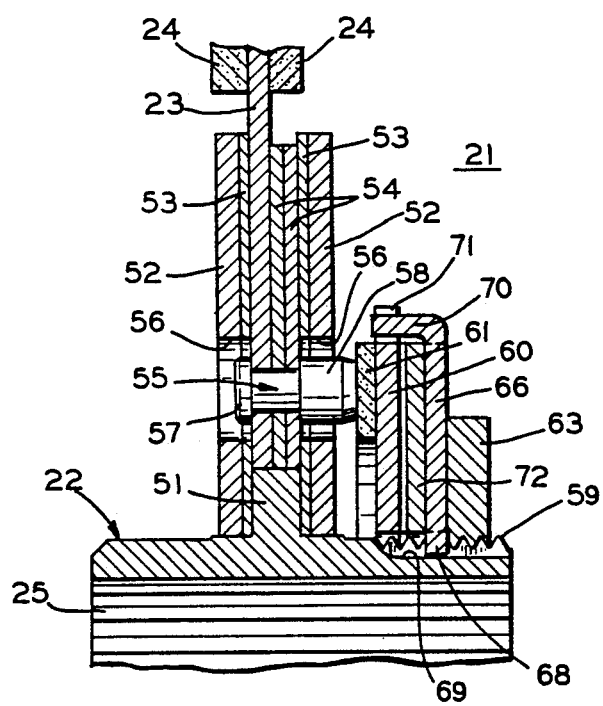
FIG. 3 is an enlarged fragmentary cross sectional view of the driven disc assembly and adjusting apparatus shown in FIG. 1.

The driven disc assembly 21 is shown in more detail in FIGS. 2 and 3 and includes a central hub 22 extending through a support plate 23 secured thereto with friction material facings 24 fastened on opposite sides of the support plate 23. The hub 22 has a centrally formed aperture with internal splines 25 formed therein which cooperate with external splines 26 formed on an end of a transmission input shaft 27. The periphery of the support plate 23 and the friction facings 24 are thus positioned between the flywheel 14 and the pressure plate 20. The splined connection between the hub 22 and the input shaft 27 permits the driven disc assembly 21 to move freely in an axial direction relative to the input shaft 27 while being coupled for rotation with it. The pressure plate 20 is axially moveable into engagement with the driven disc assembly 21 to clamp the same against the flywheel 14 for drivingly connecting the rotatable drive and driven members of the clutch. A plurality of circumferentially spaced drive straps 28 rotatably connect the pressure plate 20 to the cover 12 and permit limited axial movement of the pressure plate 20 relative to the cover 12. The straps 28 further serve as a means to lift the pressure plate 20 away from the flywheel 14 when the clutch 11 is actuated to its disengaged position. The opposite ends of the drive straps 28 are connected by rivets 29 to the end wall 17 and by threaded fasteners 30 to the pressure plate 20.

A lever operating mechanism is provided to move the pressure plate 20 axially relative to the cover 12 and into and out of engagement with the driven disc 21. The lever operating mechanism is disposed wholly outside the cover 12, and includes a plurality of radially extending levers 31 pivotally connected to the cover 12 by pivot pins 32. Outer or tail ends 33 of each of levers 31 engage integral bosses 34 formed on the pressure plate 20.

Resilient means 35 are provided to apply an axial engaging force to the pressure plate 20 to normally urge the same into clamping engagement with the driven disc 21. The resilient means 35 is preferably designed to maintain a substantially constant pressure regardless of wear on the driven disc friction facing 24. In the preferred embodiment, the resilient means 35 is an annular Belleville spring compressed between the cover 12 and the levers 31. The Belleville spring 35 in its unstressed state is conical in shape, having an inner peripheral portion 36, an intermediate cone-shaped portion 37, and an outer peripheral portion 38. The inner and outer peripheral portions 36 and 38 are axially spaced and approach the same plane as the spring 35 is placed under compression, the spring being designed to have the fixed inner peripheral portion 36 react against the cover 12, and the moveable outer peripheral portion 38 engage and be moveable with the levers 31. Because of the spring movement, the cover ramp 18 is angled to permit clearance during operation.

The levers 31 are arranged to be depressed against the action of the spring 35 by a throw out bearing 39 operating against inner or nose ends 40 of the levers 31. Operation of the throw out bearing 39 causes the levers 31 to pivot about the pins 32. The outer ends 33 respond by moving the pressure plate 20 clampingly against the driven disc assembly 21 to force the same against the flywheel 14.

To equally distribute load from the spring 35 to the levers 31, an annular collector ring 41 is provided. The collector ring 41 is cup-shaped in cross-section, and comprises an annular, axially extending rim 42 which encircles the outer peripheral portion 38 of the spring 35, and has a radially inwardly extending annular base 43. The base 43 is adapted to be positioned between the back face of the spring 35, and adjacent the front face of the levers 31. Thus, the base 43 is disposed for transferring the reaction load of the spring 35 to the levers 31, and is disposed at a slight angle to provide clearance for the outer peripheral portion 38 when the levers 31 are pivoted to their clutch disengaged position. The collector ring 41 has sufficient clearance with respect to the outer peripheral portion 38 to permit it to move freely during the various clutch operating stages. Since the levers 31 are in constant contact with the collector ring base 43, they serve to hold the collector ring 41 in place against the spring 35. If desired, the spring 35 may bear directly against the levers 31; however, an equal distribution of the load will result from employment of the annular collector ring 41.

The outer peripheral portion 38 of the spring 35 is encircled by the collector ring 41 as described. The inner peripheral portion 36 has a plurality of inwardly extending tongues 44 formed thereon. The tongues 44 are uniformly spaced apart, each tongue 44 extending into a corresponding recess 45 which in turn extends inwardly from the ramp 18. Each recess 45 has sidewalls (not shown), and a lip 46 for a secure non-slipping engagement of the inner peripheral portion 36 of the spring 35 and the cover 12. The operation of the clutch described is that of a conventional "push-type" clutch. Thus, in the normally engaged position of the clutch, the tongues 44 of the spring 35 will react in the recesses 45 of the cover 12. The outer periphery 38 of the spring 35 will urge the collector ring 41 axially outwardly against intermediate noses 47 of the levers 31. The levers 31 will then pivot about the pins 32 and the outer ends 33 will exert an axially inward force against the pressure plate 20 through the pressure plate bosses 34.

To disengage the clutch, an operator will typically depress a clutch pedal with his left foot. This action will cause the throw out bearing 39 to move axially inwardly against the inner ends or noses 40 of the levers 31. The intermediate noses 47 will then urge the collector ring 41 axially inwardly, thus collapsing the spring and causing inner 36 and outer 38 peripheral portions thereof to lie in a common plane. The levers 31 will pivot about the pins 32, and the outer ends 33 thereof will release the axial pressure previously held against the pressure plate bosses 34.

A central portion of the driven disc assembly 21 is shown in enlarged cross section in FIG. 3. The assembly 21 can be similar to that shown in U.S. Pat. No. 4,254,855 which assembly comprises rotary torque transmitting elements connected by a dampening unit designed to establish a resilient drive between the rotary elements. The damper unit is needed to tune the vehicle drive train system so that critical torsional vibrations are moved out of the operating speed range of the engine and the rest of the drive train. The hub 22 includes an integral radially outwardly extending annular flange 51. Positioned on opposite sides of the flange 51 are a pair of spaced apart outer annular covers 52. The support plate 23 with its friction facings 24 is located in the space provided between the outer covers 52. The above-identified patent shows coaxial pairs of coil springs retained in openings provided in the covers 52 and the plate 23 to transmit drive between the covers 52 and the plate 23 and also provide resilient means for absorbing the torque of the engine, thereby eliminating chatter and rattle in the vehicle drive line. Secondary or auxiliary cover members are provided primarily to serve as drive means for the springs. The secondary cover members comprise a pair of flat, annular plates 53 located on opposite sides of the hub flange 51 and inside the outer or main covers 52. A series of rivets (not shown) extend through holes in the main covers 52, the secondary covers 53 and the hub flange 51 to secure these parts together as a unitary structure or subassembly. The secondary covers 53 are formed with stamped openings (not shown) for alignment with the spring openings in the main covers 52 and the support plate 23.

To substantially fill the axial space between the auxiliary covers 53, a plurality of flat annular reinforcing plates 54 are positioned on one side of the support plate 23. A plurality of fasteners such as rivets 55 securely attach the reinforcing plates 54 to the support plate 23 so that they operate as a unit or subassembly. The subassembly formed by the hub 22 and the inner 53 and outer 52 covers secured together will operate as a rotatable driven member of the clutch disc assembly 21. The rotatable drive member of the clutch disc assembly 21 is the subassembly formed by the support 23 and reinforcing 54 plates described above. To accommodate the limited rotation that occurs between the two subassemblies, circumferentially elongated openings 56 are provided in the covers 52 and 53 into which opposed heads of the rivets 55 project. The openings 56 permit the necessary clearance to the rivet heads as the coaxial springs (not shown) are being compressed to establish the resilient driving connection or to absorb shocks and vibrations in the vehicle drive system.

An end 57 of the rivet 55 closer to the flywheel 14 extends into one of the openings 56 but does not project beyond an outer surface of the associated outer cover 52. An opposite end 58 of the rivet 55 is enlarged and projects through another opening 56 beyond an outer surface of the associated outer cover 52 toward the pressure plate 20. As will be explained below, the head 58 of the rivet 55 engages elements of the damper adjusting apparatus according to the present invention.

Referring to FIGS. 1 through 3, an end 59 of the hub 22 which extends through the central opening in the pressure plate 20 is externally threaded. The end 59 also extends through a central aperture in an annular backing plate 60. The backing plate 60 has an annular facing material 61 affixed to a surface thereof for abutting the enlarged ends 58 of the rivets 55. A central aperture 62 is formed in the backing plate 60 which aperture is larger in diameter than the threaded end 59 such that the plate 60 can move axially with respect to the hub 22. The backing plate 60 is maintained on the threaded end 59 by a locking nut 63 having an internally threaded central aperture 64 formed therein for threadably engaging the threaded end 59. The locking nut 63 has a pair of spaced apart apertures 65 formed therein for engaging pins on a wrench. Trapped between the backing plate 60 and the locking nut 63 is a locking ring 66 formed as an annular plate. The ring 66 has a central aperture 67 formed therein larger in diameter than the threaded end 59 and an integral radially inwardly extending tab or tang 68. The tang 68 engages an axially extending slot or keyway 69 formed in an outer surface of the threaded end 59 of the hub 22. Thus, the locking ring 66 is coupled to rotate with the subassembly including the hub 22. If the tang 68 is substantially the width of the keyway 69, the locking ring 66 will remain in position with the hub 22 as the support plate subassembly begins to rotate. As an alternative, the keyway 69 can be formed wider than the tang 68 such that the locking ring 66 rotates with the support plate subassembly until the tang 68 engages a sidewall of the keyway 69 thereby delaying the loading.

The locking ring 66 also has a second tang 70 formed thereon, which tab extends radially outwardly and turns to extend in a direction generally parallel to the longitudinal axis of the hub 22 toward the closer outer cover 52. The second tang 70 engages a slot 71 formed in an outer periphery of the backing plate 60. Thus, the hub subassembly, the locking ring 66 and the backing plate 60 are coupled together for rotation. Positioned between the facing surfaces of the backing plate 60 and the locking ring 66 is a spring means such as a wave washer 72 having a central aperture 73 formed therein larger in diameter than the outer diameter of the end 59. As the locking nut 63 is threaded onto the threaded end 59 of the hub 22, the locking ring 66 will be forced toward the backing plate 60 thereby compressing the wave washer 72 which exerts an ever increasing axial load or pressure on the backing plate 60 to force it against the enlarged ends 58 of the rivets 55. The load applied by the wave washer 72 to the rivet ends 58 resists relative rotation between the two driven disc subassemblies. This load can be selectively adjusted at the initial assembly of the driven disc 21 and readjusted after wear has occurred by rotating the nut 63.

Figure 4:
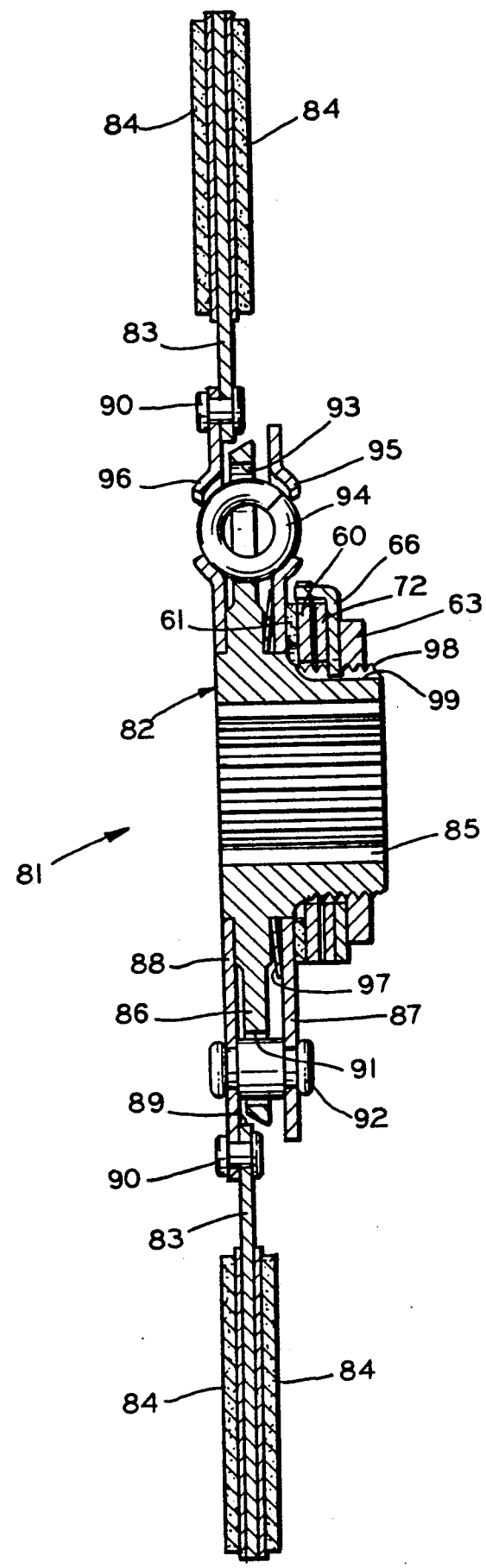
FIG. 4 is a cross-sectional view of an alternate embodiment of the driven disc assembly and adjusting apparatus shown in FIG. 1.

In FIG. 4, there is shown an alternate embodiment of the present invention. A driven disc assembly 81 includes a central hub 82 extending through a support plate 83 secured thereto with friction material facings 84 fastened on opposite sides of the support plate. The hub 82 has a centrally formed aperture with internal splines 85 formed therein which cooperate with the external splines 26 formed on an end of the transmission input shaft 27 shown in FIG. 1. The hub 82 includes an integral radially outwardly extending annular flange 86. Positioned on opposite sides of the flange 86 are a pair of spaced apart outer annular covers 87 and 88. The cover 87 is located on the side of the flange 86 facing the throw out bearing (FIG. 1) and the cover 88 is located on the opposite side of the flange. The support plate 83 has a central aperture 89 formed therein which is slightly smaller in diameter than an outer diameter of the outer cover 88. Thus, an inner periphery of the support plate 83 is positioned adjacent an outer periphery of the flange 86 such that an outer surface of the support plate 83 abuts an inwardly facing surface of the cover 88. The support plate 83 is attached to the cover 88 by a plurality of fasteners such as rivets 90.

The outer covers 86 and 87 are attached to the central hub 82 in a manner which provides for a limited amount of relative rotational movement about the longitudinal axis of the central hub 82. A plurality of elongated arcuate slots 91 are formed in the flange 86 at spaced intervals. A rivet 92, having a smaller diameter than the height of the slot 91, extends through the slot 91 such that the rivet can move in an arcuate path from one end of the slot to the other. Opposite ends of the rivet 92 are reduced in diameter and extend through similar diameter apertures formed in the covers 87 and 88. The ends of the rivet 92 are rolled over to securely attach the covers 87 and 88 to the rivet 92 such that the covers 87 and 88 will rotate together relative to the hub 82 an arcuate distance defined by the distance between the ends of the slot 91.

Alternating with and located between the slots 91 are a plurality of elongated arcuate slots 93 formed in the flange 86. Positioned in each of the slots 93 is a helical damper spring 94. The spring 94 is retained in the slot 93 by openings formed in the covers 87 and 88 defined by outwardly extending arcuate lips 95 and 96 respectively which retain the coil spring 94 in the openings. When there is relative rotation between the central hub 82 and the covers 87 and 88, one end of each of the springs 94 engages an adjacent end of the slot 93 and the other end of the spring 94 engages the ends of the openings defined in the covers 87 and 88 whereby the spring is compressed to absorb or prevent minor transmission of shock loads and torsional vibration in the drive line and establishes the initial resilient drive connection between the rotary clutch elements.

The outer cover 87 is spaced from the flange 86 by a resilient means such as a Belleville spring 97. The spring 97 has a central opening through which the central hub 82 extends and is trapped between the flange 86 and the inner surface of the outer cover 87. The spring 97 tends to force the outer cover 87 away from the flange 87 and to draw the outer cover 88 into contact with the flange 86. Applying an opposing force is the adjustable damper shown in FIG. 2. An end 98 of the hub 82 is externally threaded and an axially extending keyway 99 is formed along the threaded outer surface. The hub end 98 extends through a central aperture in the backing plate 60 such that the annular facing material 61 abuts an outer surface of the outer cover 87. The backing plate is retained on the hub by the threaded locking nut 63. Trapped between the backing plate 60 and the locking nut 63 is the locking ring 66 which has the inwardly extending tang which engages the keyway 99. The locking ring 66 has the second tang formed on its periphery which engages a slot formed in the outer periphery of the backing plate 60. Thus, the backing plate 60 and the locking ring 66 will rotate with the hub 82. Positioned between the facing surfaces of the backing plate 60 and the locking ring 66 is the wave washer 72 which tends to exert an axial load on the cover plate 87. This load can be selectively adjusted at the initial assembly of the driven disk 81 and readjusted after wear has occurred by rotating the nut 63.

The present invention concerns a clutch driven disc assembly including a hub, a facing and disc subassembly mounted on and rotatable relative to the hub, and adjustment means mounted on the hub and abutting the subassembly for applying an axial load to the subassembly, the adjustment means threadably engaging the hub for selectively adjusting the axial load. In one embodiment, the facing and disc subassembly includes a support plate mounted on and rotatable relative to the hub, at least one reinforcing plate mounted on and rotatable relative the hub, and a plurality of circumferentially spaced fasteners connecting together the support plate and the reinforcing plate. The adjustment means has a backing plate mounted on the hub and abutting the fasteners for applying an axial load through the fasteners to the support plate and the reinforcing plate. The load is selectively adjustable through a threaded locking nut and wave washer mounted on the hub. In another embodiment, the facing and disc subassembly includes a support plate attached to one of two outer covers which are mounted on and rotatable relative to a central hub. The covers retain damper springs and are attached together by rivets extending through elongated slots formed in a flange on the hub. The above described adjustment means is mounted on the hub and the facing material on the backing plate is abutted against an outer surface of the other outer cover for applying an axial load to the damper.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A clutch driven disc assembly comprising:
    a hub;
    a facing and disc subassembly mounted on and rotatable relative to said hub; and
    adjustment means mounted on said hub and abutting said subassembly for applying an axial load to said subassembly, said adjustment means threadably engaging said hub for selectively adjusting the axial load.

2. The apparatus according to claim 1 wherein said adjustment means includes a backing plate mounted on said hub adjacent to said subassembly for applying an axial load to said subassembly.

3. The apparatus according to claim 2 including a facing material attached to said backing plate and abutting an exterior surface of said subassembly.

4. The apparatus according to claim 2 including means for preventing relative rotation between said hub and said backing plate.

5. The apparatus according to claim 4 wherein said means for preventing relative rotation includes a locking ring mounted on said hub, said locking ring having a first tang formed thereon engaging a keyway formed in said hub and a second tang formed thereon engaging a slot formed in said backing plate.

6. The apparatus according to claim 5 including a locking nut threadably engaging said hub for axially adjusting the positions of said locking ring and said backing plate with respect to said fasteners.

7. The apparatus according to claim 6 including a spring means positioned between said backing plate and said locking ring for applying an axial load to said fasteners through said backing plate.

8. The apparatus according to claim 7 wherein said spring means is a wave washer.

9. The apparatus according to claim 4 wherein said means for preventing relative rotation between said hub and said backing plate includes a locking ring mounted on said hub, said locking ring having a first tang formed thereon engaging a keyway formed in said hub and a second tang formed thereon engaging a slot formed in said backing plate and said keyway being wider than said first tang for permitting limited relative rotation between said hub and said backing plate.

10. A clutch driven disc assembly comprising:
    a hub having a radially extending flange;
    a pair of outer covers mounted on opposite sides of said flange and rotatable relative to said hub;
    a support plate attached to one of said covers;
    a backing plate mounted on said hub adjacent to the other one of said covers for applying an axial load to said covers and said support plate; and
    a locking ring mounted on said hub, said locking ring having a first tang formed thereon engaging a keyway formed in said hub and a second tang formed thereon engaging a slot formed in said backing plate, and said keyway being wider than said first tang for permitting limited relative rotation between said hub and said backing plate.

11. The apparatus according to claim 10 including a locking nut threadably engaging said hub for axially adjusting the positions of said locking ring and said backing plate with respect to said other cover.

12. The apparatus according to claim 11 including a spring means positioned between said backing plate and said locking ring for applying an axial load to said other cover through said backing plate.

13. A clutch driven disc assembly comprising:

a hub;

a pair of spaced apart outer covers mounted on said hub for relative rotation thereto;

a support plate attached to one of said covers a backing plate mounted on said hub adjacent to an exterior surface of the other one end of said covers for applying an axial load to said covers and said support plate; and means for selectively adjusting the axial load, said means for selectively adjusting including a locking ring mounted on said hub, said locking ring having a first tang formed thereon engaging a keyway formed in said hub and a second tang formed thereon engaging a slot formed in said backing plate, a locking nut threadably engaging said hub for axially adjusting the positions of said locking ring and said backing plate with respect to said other cover, and a spring means positioned between said backing plate and said locking ring for applying an axial load to said other cover through said backing plate.

14. The apparatus according to claim 13 wherein said spring means is a wave washer.

* * * * *